United States Patent
Tsuk

(10) Patent No.: US 10,832,441 B2
(45) Date of Patent: Nov. 10, 2020

(54) GLOBAL POSITIONING OF A SENSOR WITH RESPECT TO DIFFERENT TILES FOR A GLOBAL THREE-DIMENSIONAL SURFACE RECONSTRUCTION

(71) Applicant: HEXAGON METROLOGY (ISRAEL) LTD., Ramat Hasharon (IL)

(72) Inventor: Nir Tsuk, Tel Aviv (IL)

(73) Assignee: HEXAGON METROLOGY (ISRAEL) LTD., Ramat Hasharon (IL)

( * ) Notice: Subject to any disclaimer, the term of this patent is extended or adjusted under 35 U.S.C. 154(b) by 0 days.

(21) Appl. No.: 16/141,531

(22) Filed: Sep. 25, 2018

(65) Prior Publication Data
US 2019/0096088 A1 Mar. 28, 2019

(30) Foreign Application Priority Data
Sep. 26, 2017 (EP) .................................. 17193340

(51) Int. Cl.
| | |
|---|---|
| H04N 7/18 | (2006.01) |
| G06T 7/73 | (2017.01) |
| G01B 11/25 | (2006.01) |
| G06T 7/521 | (2017.01) |
| G06T 7/246 | (2017.01) |

(Continued)

(52) U.S. Cl.
CPC ............ G06T 7/74 (2017.01); G01B 11/2513 (2013.01); G01B 11/2545 (2013.01);
(Continued)

(58) Field of Classification Search
CPC ........... G06T 7/74; G06T 17/20; G06T 7/246; G06T 7/40; G06T 2207/10012;
(Continued)

(56) References Cited

U.S. PATENT DOCUMENTS

| | | | |
|---|---|---|---|
| 2007/0091174 A1* | 4/2007 | Kochi ................ | G01B 11/2509 348/135 |
| 2007/0103460 A1 | 5/2007 | Zhang et al. | |

(Continued)

FOREIGN PATENT DOCUMENTS

| | | |
|---|---|---|
| CN | 103562675 U | 2/2014 |
| CN | 103971353 A | 8/2014 |
| EP | 1 770 356 A2 | 4/2007 |

OTHER PUBLICATIONS

Extended European Search Report dated Apr. 9, 2018 as received in Application No. 17193340.1.

*Primary Examiner* — Peet Dhillon
(74) *Attorney, Agent, or Firm* — Maschoff Brennan

(57) ABSTRACT

A measuring system can three-dimensionally reconstruct surface geometry of an object by, from a first pose with a sensor, generating a first three-dimensional representation of a first portion of the object, and with a first camera, generating a first image covering at least part of the first portion, and from a second pose with the sensor, generating a second three-dimensional representation of a second portion of the object, and with the first camera, generating a second image covering at least part of the second portion. A stationary first projector can be arranged externally configured for projecting a texture onto both first and second portions of the object. A stitching computer can be configured for generating a unitary three-dimensional representation of both the first and second portions of the object from the first and second three-dimensional representations based on the first and second images.

20 Claims, 2 Drawing Sheets

(51) Int. Cl.
*H04N 13/204* (2018.01)
*G06K 9/62* (2006.01)
*G06T 7/40* (2017.01)
*G06T 17/20* (2006.01)
*G06T 7/593* (2017.01)

(52) U.S. Cl.
CPC ............ *G06K 9/6202* (2013.01); *G06T 7/246* (2017.01); *G06T 7/40* (2013.01); *G06T 7/521* (2017.01); *G06T 17/20* (2013.01); *H04N 13/204* (2018.05); *G06T 7/593* (2017.01); *G06T 2207/10012* (2013.01); *G06T 2207/10016* (2013.01); *G06T 2207/10028* (2013.01); *G06T 2207/20221* (2013.01); *G06T 2207/30204* (2013.01)

(58) Field of Classification Search
CPC . G06T 2207/10016; G06T 2207/10028; G06T 2207/20221; G06T 2207/302044; G06T 2207/593; G01B 11/2513; G01B 11/2445; G06K 9/6202; H04N 13/204
See application file for complete search history.

(56) References Cited

U.S. PATENT DOCUMENTS

| | | | |
|---|---|---|---|
| 2008/0285843 A1* | 11/2008 | Lim | G06K 9/2036 382/154 |
| 2010/0329538 A1 | 12/2010 | Remillard | |
| 2014/0063204 A1 | 3/2014 | Siercks | |
| 2015/0130928 A1* | 5/2015 | Maynard | G01B 11/14 348/135 |
| 2015/0381968 A1 | 12/2015 | Arora et al. | |
| 2016/0133032 A1* | 5/2016 | Monkawa | G01N 23/046 378/62 |
| 2017/0039756 A1 | 2/2017 | Moule et al. | |
| 2017/0277187 A1* | 9/2017 | Refai | G06T 7/30 |

* cited by examiner

GLOBAL POSITIONING OF A SENSOR WITH RESPECT TO DIFFERENT TILES FOR A GLOBAL THREE-DIMENSIONAL SURFACE RECONSTRUCTION

CROSS-REFERENCE TO RELATED APPLICATIONS

This application claims priority to European Patent Application No. 17193340.1 filed on Sep. 26, 2017, which is incorporated herein by reference.

FIELD OF THE INVENTION

The present invention relates to a measuring system for three-dimensionally reconstructing a surface geometry of an object.

BACKGROUND

For generating a numerical representation of a structure with a three-dimensional measurement of said structure, a variety of measuring devices are available, such as white light scanners, blue light scanners, optical or tactile Coordinate Measuring Machines (CMM), 3D laser scanners, ultrasonic thickness testers, or Computer Tomography based scanning devices. Such devices are utilised in engineering, inspecting, and manufacturing processes in automotive and other manufacturing industries. In these fields of application, measurement systems are required to be flexible at use while complying with highest precision standards.

Generic measuring devices can also merge several partial measurements (i.e. measurements of parts of the object) for generating a comprehensive three-dimensional representation of a structure. Due to this functionality, which is also referred to as stitching, a structure can be divided into sections (i.e. into tiles) of which partial measurements are taken.

In the stitching process, the relative position(s) and orientation(s) (i.e. the relative pose(s)) between the point clouds of the particular tiles need to be determined. For this purpose, known measuring devices are reliant on mechanisms for detecting the pose of the measuring device over the time, so as to derive said relative poses of the tiles. For example, the pose of the measuring device is monitored by angle encoders of a robot arm and/or by laser tracking of the measuring device.

These pose detection mechanisms are however subject to an accumulation of errors, to temperature dependency, and/or to a disadvantageous repeatability. Therefore, said mechanisms need a calibration at regular intervals in order to provide a sustainable precision when stitching the tiles. These circumstances cause time expenses in the measurement process and still provide a relatively unstable precision regarding the tile poses.

Furthermore, for positioning, other known measuring systems rely on the usage of targets/markers on the part, which are captured from different viewing points and therefore act as reference. This, however, is not only expensive but also a complex endeavor.

SUMMARY

In some embodiments, the invention provides a measuring system providing an improved stitching functionality. In particular, the present invention provides a measuring system with a higher and more stable precision regarding the stitching of tiles. Another embodiment of the invention is to make the measurement process less complex.

In some embodiments, at least one of these improvements is achieved by the measuring system according to embodiments described herein.

In some embodiments, the invention relates to a measuring system configured for three-dimensionally reconstructing a surface geometry of an object, the system comprising a movable measuring device comprising a sensor and a first camera, wherein the measuring device is configured for, from a first pose with the sensor, generating a first three-dimensional representation of a first portion of the object, and with the first camera, generating a first image covering at least part of the first portion of the object, and from a second pose with the sensor, generating a second three-dimensional representation of a second portion of the object, and with the first camera, generating a second image covering at least part of the second portion of the object, a stationary first projector arranged externally with respect to the measuring device, and configured for projecting a texture onto both first and second portions of the object, and a stitching computer configured for generating a unitary three-dimensional representation of both the first and second portions of the object from the first and second three-dimensional representations based on the first and second images.

In some embodiments, the sensor is configured for generating three-dimensional representation. The sensor may comprise at least one camera, in particular a stereo camera. The sensor may, in particular, comprise the first camera and a second camera.

The sensor, however, may alternatively or additionally comprise an Electronic Distance Meter (EDM). The sensor may alternatively or additionally comprise a laser scanner.

In some embodiments, the texture may have a non-repetitive pattern. In other words, the projector may be configured for projecting the texture with a non-repetitive pattern.

In some embodiments, the first projector may be configured for projecting the same texture with respect to the moments the first camera is generating the first and second image.

For generating a unitary three-dimensional representation, the stitching computer may be configured for matching the first and second three-dimensional representations based on the texture as captured in the first and second images.

The first image, the second image, the first three-dimensional representation, and the second three-dimensional representations may have a common overlap area. That is, the first pose and the second pose are chosen accordingly to this end.

In some embodiments, it is possible the camera has a smaller, a larger, or essentially the same field of view compared to the field of view of the sensor. The field of view of the camera and the field of view of the sensor, however, generally do overlap at least in part due to their setup. In other words: the first image and the first three-dimensional representation have a common (first) overlap area. This first overlap area, again, has an overlap with a second overlap area (which is an overlap of a second image with a second three-dimensional representation).

For generating a unitary three-dimensional representation, the stitching computer may be configured for transforming at least one of the first and second three-dimensional representations based on matching the texture as captured in the first image and the texture as captured in the second image.

In some embodiments, the measuring device may further be configured for, from a third pose, with the sensor, generating a third three-dimensional representation of a third portion of the object, and with the first camera, generating a third image covering at least part of the third portion of the object, and wherein the stitching computer may be configured for generating a unitary three-dimensional representation of the first, second, and third portions of the object from the first, second, and third three-dimensional representations based on the third image and at least one of the first and second image. That is, based on the second and third images, the third three-dimensional representation is stitched with the already stitched first and second three-dimensional representation. Like this the unitary three-dimensional representation is added tile for tile.

In some embodiments, the stitching computer may be configured for applying an Expectation-maximisation (EM)-optimisation of the unitary three-dimensional representation of the first, second, and third portions of the object based on the first, second, and third images.

In some embodiments, the stitching computer may be configured for stitching the three-dimensional representations in a batch process after a plurality of images and corresponding three-dimensional representations have been obtained.

In some embodiments, the stitching computer may be configured for receiving pose data, wherein the pose data represent a chronological sequence of poses of the measuring device, and generating the unitary three-dimensional representation based on the pose data. The pose data may be provided by an Inertial Measuring Unit (IMU) comprised by the measuring device, by angle encoders of a robot arm the measuring device may be arranged on, by an angle encoder of a turntable the measuring device may be arranged on, by a positioning unit of an assembly line the object may be arranged on. The pose data are consider a rough estimation (or a means for the purpose to derive a rough estimation) of the relative pose between the three-dimensional representations of the tiles. The high-precision stitching based on the images is considered the fine-adjustment of the matching of the tile representations.

In some embodiments, the measuring device may be configured for generating the pose data. For example, the pose data may be generated by feature tracking of a video capture by the camera. The pose data may also be derived by a Simultaneous Localisation and Mapping (SLAM)-process performed with the camera. Also, the pose data may roughly be extracted by analysing the texture by its unique pattern which is pre-known.

In some embodiments, the measuring system may further comprise positioning means configured for moving the measuring device, and a controller configured for controlling the positioning means and providing the first and second pose as a predetermined pose.

In this configuration, a suitable and/or optimal pose composition may be determined or predefined with regard to stitching and/or capturing the three-dimensional representations.

In some embodiments, the measuring system may further comprise a second projector, which is stationary or comprised by the measuring device. The second projector may be configured for projecting a texture onto both first and second portions of the object. In particular, the texture projected by the second projector may differ from the texture projected by the first projector. However, all projectors may as well project the exact same texture, wherein each projection is either processed separately, or even if more than one projection are processed together, each projection may be projected in different areas of the part such that the projections do not overlap by means of their patterns.

In some embodiments, the stitching computer may be configured for scaling the three-dimensional representations by detecting and identifying a known marker in at least one of the first image and the second image. In particular, several markers can be used which are placed in different areas of the fixture. Said markers are usually detected in separate images and they are detected in some of the tiles. Said marker(s) may be part of the measuring system and placed at (a) defined location(s) with respect to the object. Because the pose and the dimensions of the marker(s) are predefined, the scale of the three-dimensional representations can be derived.

In some embodiments, the first camera is arranged in a defined pose relative to the sensor.

In some embodiments, the projector illuminates constantly its texture onto the object, or the illumination is synchronised with the capturing time points of the measuring device.

In some embodiments, the projected texture can be used to guide the sensor to a next tile. For this purpose, the texture can be coded with a defined code pattern such that the sensor can immediately read the next tile to capture. Alternatively, the texture has a random pattern and the sensor is configured for automatically calculating the next tile to capture. A next tile can however also be picked arbitrarily by the user unless there is no positioning initial guess. The user can even take a new tile that has no overlapping at all with other tiles and later add the overlapping tiles inbetween. In case there is no initial guess (e.g. when the texture is not coded) the sensor can be configured for automatically calculating the next tile to capture.

For stitching the first and second portions (tiles) of the object, the stitching computer may first apply Homography image processing to the first and second images, in particular in order to ease an image correlation/correspondence within the images. The Homography is used to transform the images so they will be in similar viewing angles before the correspondence begins.

In some embodiments, rather than using a laser tracker, mapped targets, or robot repeatability, the position of a sensor is determined with one or more digital projectors. The projector(s) projects a random texture on the part which texture is detectable by the sensor in various positions and orientations. The texture may be a non-repeatable pattern that ensures in each small area of it to have changes (gradients) in both X/Y axes to enable accurate correspondence between two different viewing points.

For this purpose, the sensor has at least one camera that captures the projected texture. The projector(s) is/are static relative to the part during the measurement period (in case of an automatic station with a robot, the projector should be static only along one automatic run which typically takes several minutes). The three-dimensional reconstructions generated by the sensor have a known and pre-defined spatial relationship with the images generated by the camera. On each overlapping area that is viewed from two different viewing points (or tiles), corresponding two-dimensional points in the images captured with the camera are identified. In consequence, the corresponding three-dimensional representations (point clouds) undergo a relative six-degree-of-freedom transformation (rotation and translation) based on the matched two-dimensional points in the images. To improve the final positioning from all pairs, optionally an EM-optimisation can be applied that considers all data from all 3D-2D-pairs (point clouds+images) together. The images captured from the different poses may have at least one, i.e. in particular several overlapping areas among each other. After all tiles are stitched together, optionally a final alignment can be applied to the resulting (CAD) model.

For matching each tile to its overlapping tiles, a rough initial positioning may be performed at first. This optional measure can postpone the relatively heavy calculations of correspondences between the current tiles to all other tiles which most of them usually do not have overlap with the current tile anyway. Another advantage of this measure is that after finding the overlapping tiles the correspondences can be determined faster and more accurate based on the initial relative transformation.

For example, on an automatic station with a robot, rough robot positions can be used to obtain an initial positioning guess. These robot positions are usually much less accurate than the required positioning accuracy.

In another example, to obtain an initial guess on a portable\manual system, at least one of the following measures can be taken:

The random texture may comprise or consist of unique signatures having markers or special codes (like QR codes or any other detectable coded markers) that are spread all over the texture and can be recognised in each tile. After recognising the patterns\codes it can be checked where they appear on the previous tiles to get a rough positioning.

A known path for the measuring device can be used. Such path can be defined by the user or by the software application wherein certain poses along the path are pre-defined and each tile is to be taken in said poses. For example, it can be predetermined that a subsequent tile should be captured in a certain direction relative to the previous tile.

A rough tracking unit can be used on the measuring device, such as an IMU, which gives a rough positioning used for the initial guess.

In some embodiments, the object to be measured is arranged on a turn table or other moving platform allowing the object to be measured from more than one position. For example, this setup can be used to measure a part (such as a fender or car door) from both sides. In this case, the unified point clouds generated from the different perspectives (stations) can be linked by relative pose data which can be obtained by at least one of the following measures:

Targets/markers can be used on the movable part fixture around the part (not on the part). These targets/markers can be captured and detected on tiles near the part edges that comprise both the part and the respective target/marker. At least one target can be detected in each station (perspective) and their pose will be used to connect the different stations, by either a photogrammetry mapping of several targets around the part, or by connecting tiles from different stations that see the same targets in the stations overlapping areas. The targets can also be used for updating a hand-eye calibration between the robot coordinate system and the sensor coordinate system, which is used for calculating the initial guess positioning in automatic systems.

Different stations can also be connected in the same way as tiles are connected within the same station by using correspondences on the projected texture on overlapping areas between stations. In case the projector is not static relative to the rotating table, or in case said overlapping areas are not coverable by the projector, alternatively a physical texture (e.g. printed) can be used.

In some embodiments, for verifying the projector did not move during a measurement one or more tiles can be measured which cover an area with both the projected texture and a target/marker that can be detected regardless of the projected texture to verify the relative position of the projected texture and the targets has not changed even if a robot did not arrive exactly to the same position.

In some embodiments, offline programming can help finding the recommended poses of the sensor to ensure enough overlapping between all tiles. The software can also recommend better viewing angles, e.g. also considering the projector(s) location(s) to prevent from the sensor to hide the projection.

In some embodiments, in case there is no overlapping between different groups of tiles the stitching of each group can be combined with other positioning methods of each group. In other words, each group position (one common transformation between all tiles in the group to the global coordinate system which is common to all groups) will be set by robot repeatability/fixture targets/other positioning methods but the inner stitching will be done with the external projector. The tiles order is independent on the overlapping. Two non-overlapped tiles can be taken and then the tile in between can be completed afterwards.

In some embodiments, in case there is more than one projector, images can be generated which cover both textures together, or images can be generated which cover each projector texture separately to then determine correspondences to other tiles on each projector image separately. However, finally best transformation is determined considering all projector images. Each projector can also be controlled separately in each tile to define the intensity and exposure time of the projector and the camera that takes the images.

In some embodiments, for compensating on sensor vibrations or camera vibrations, the external projector images can be generated more than once, for example at the beginning and at the end of generating the three-dimensional representations (and in particular also in the middle). Finally, the several grabs can be used for either disqualifying the tile if the optical sensor was not stable on the current tile, or for calculating an average transformation combined by the relevant set of external projector images (two or more).

In some embodiments, scale can be set by the sensor three-dimensional reconstruction. There is an option to update the scale of the sensor using fixture targets which are mapped by photogrammetry in case the mapping scale is more accurate, usually for larger scenes. At the end of the measurement of the part together with the fixture targets, best fit can be determined with scale as an unknown and the scale correction can be calculated. The best fit is between the fixture targets reconstructed by the sensor and the mapping of the fixture targets which is fixed (assuming the fixture did not change since its mapping).

In some embodiments, for better correspondence between adjacent tiles, an initial positioning guess can be used, an Homography transformation can be calculated and images can be pre-processed to make both images as similar to each other as possible. This is mainly an option in case two viewing angles are different (for example if the sensor is tilted by 90 degrees) or when the lighting conditions are rather different between the tiles.

In conclusion, some embodiments of the invention provide a new target-less solution for global positioning by projecting a texture on a part using at least one external fixed projector and by stitching adjacent tiles based on the common projected texture using hundreds of thousands of points.

BRIEF DESCRIPTION OF THE DRAWINGS

In the following, the invention will be described in detail by referring to exemplary embodiments that are accompanied by figures, in which.

DETAILED DESCRIPTION

Figure 1:
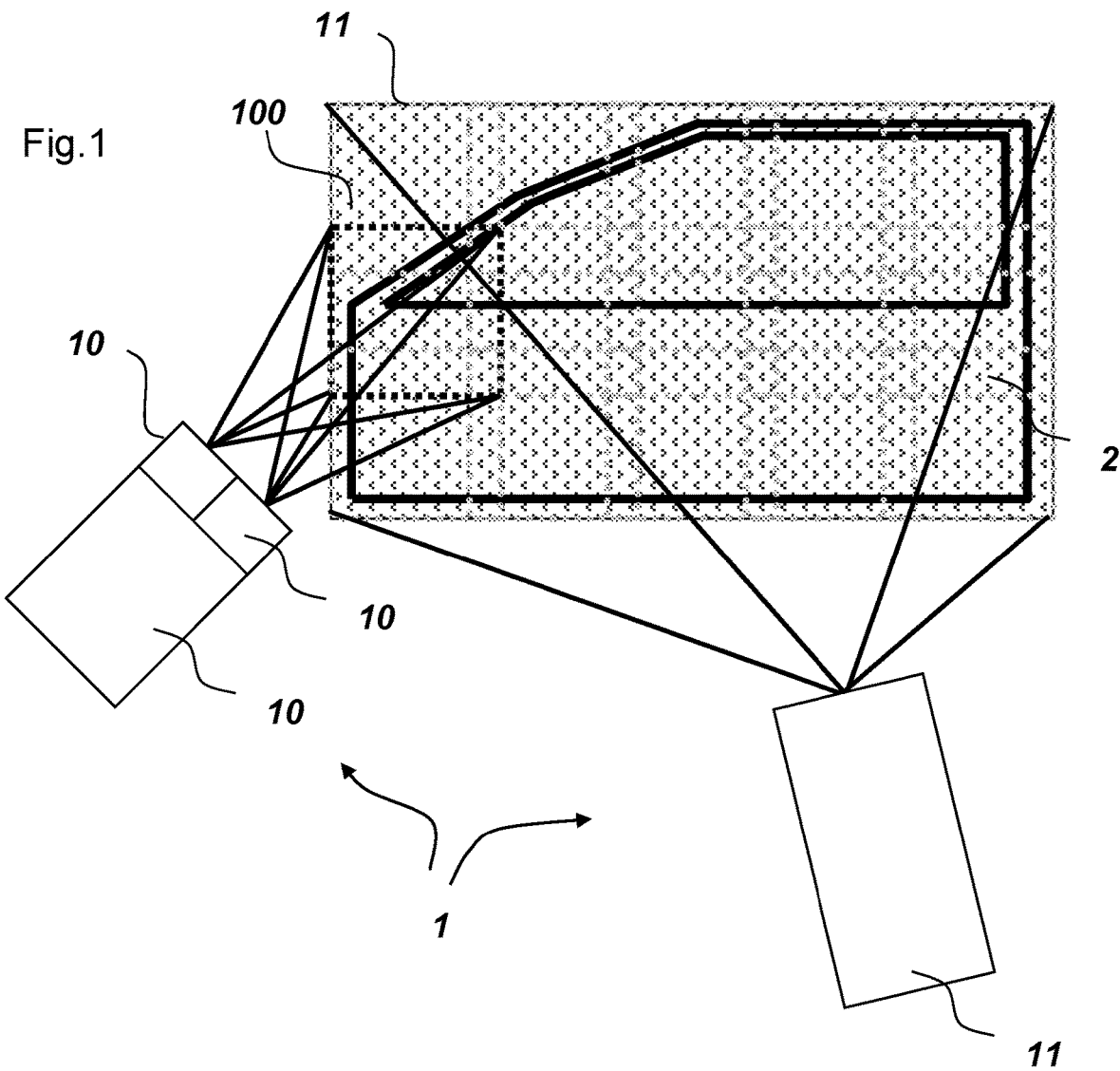
FIG. 1: shows an embodiment of the measuring system according to the invention.

FIG. 1 shows an embodiment of the measuring system 1 according to the invention. A projector 11 is configured for projecting a texture 110 onto an object 2, which is for example a door of an automobile, wherein the object 2 is statically positioned relative to the projector 11. A measuring device 10 comprising a sensor 100 and a camera 101 is movable relative to the object. By the sensor 100, the measuring device is configured for sensing the surface of the object tile by tile. By this measurement, a point cloud is generated of each tile 1001. The camera 101 is in particular configured to capture the texture 110 projected on the tile 1001.

The projector 11 is stationary with respect to its pose relative to the object 2 at least for the time the movable measuring device has generated three-dimensional representations and images of a desired amount of portions of the object (tiles). For example, if an object is exchanged, the projector 11 could be rearranged in order to better cover the object with the texture.

In the embodiment shown in FIG. 1, the field of view of the camera 101 coincides on the object with the field of view of the sensor 100. It is however also possible that said fields of view do not exactly coincide on the object. For example the field of view of the camera 101 may be wider for capturing a larger area on the object than is the field of view of the sensor 100, or vice versa.

In particular, the camera 101 may be configured to capture on the object an area which the sensor 100 does not capture. This extended coverage may extend at least in part around the area captured by the sensor and can particularly be used for stitching two adjacent tiles because (at least) the extended coverage overlaps with the image of the preceding tile.

The camera 101 can be understood as separate element comprised by the measuring device, besides the sensor 100. It may however also be understood as part of the sensor 100, for example in case an essential element of the sensor is at least one camera. In this case, the sensor 100 is configured for generating the three-dimensional representations (point clouds) and for generating the images.

For example, a unitary three-dimensional representation of the whole object 2 can be generated by sequentially or accumulatively stitching tile for tile, and/or a bunch of tiles can be recorded (point clouds and images) and the unitary three-dimensional representation is then generated in a batch process using the images, wherein each image has overlap with at least one other image.

The projector may illuminate the object permanently while all the tiles 1001 are recorded, or it may illuminate the object only in moments the measuring device is recording each tile (generating a three-dimensional representation and image). In either case, the projected texture 110 has the same pattern in said moments of recording such that with means of re-identified pattern sections in the images, the point clouds can be stitched.

Figure 2:
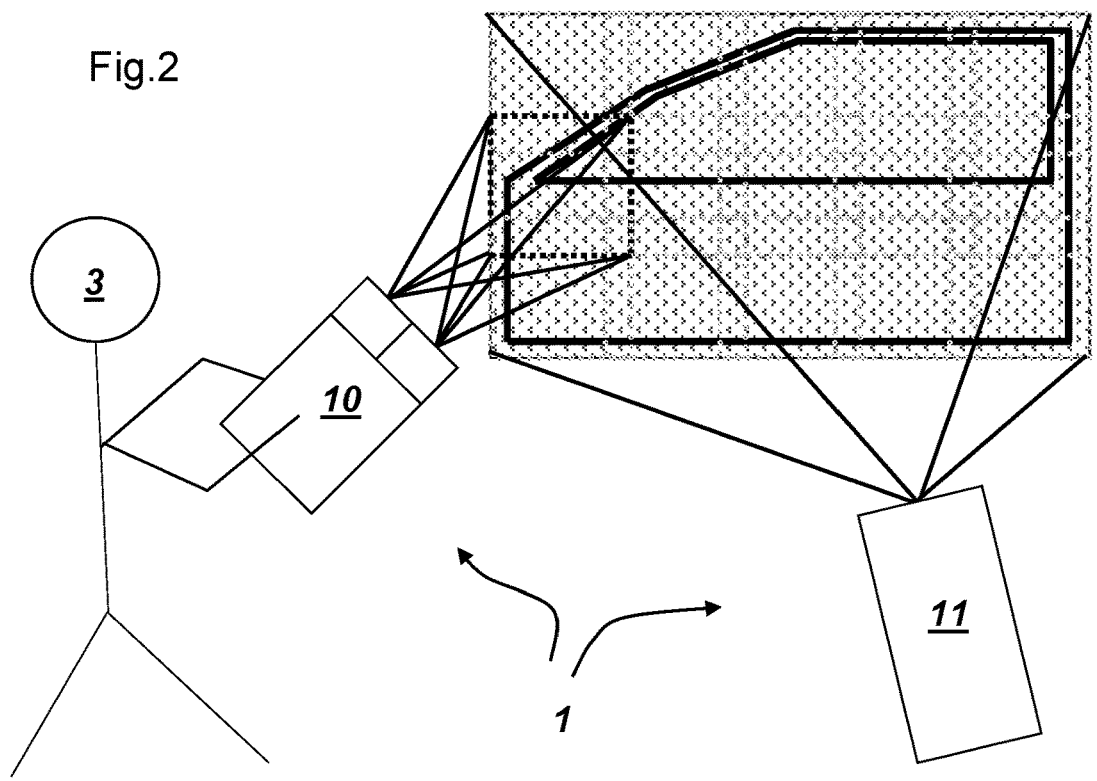
FIG. 2: shows a second embodiment of the measuring system according to the invention.

According to FIG. 2, the measuring device may be hand-held and/or configured for being hand-held. A user 3 can guide the measuring device 10 along the object to point at random or pre-defined tiles and at each tile trigger the generation of a point cloud and a corresponding image.

Figure 3:
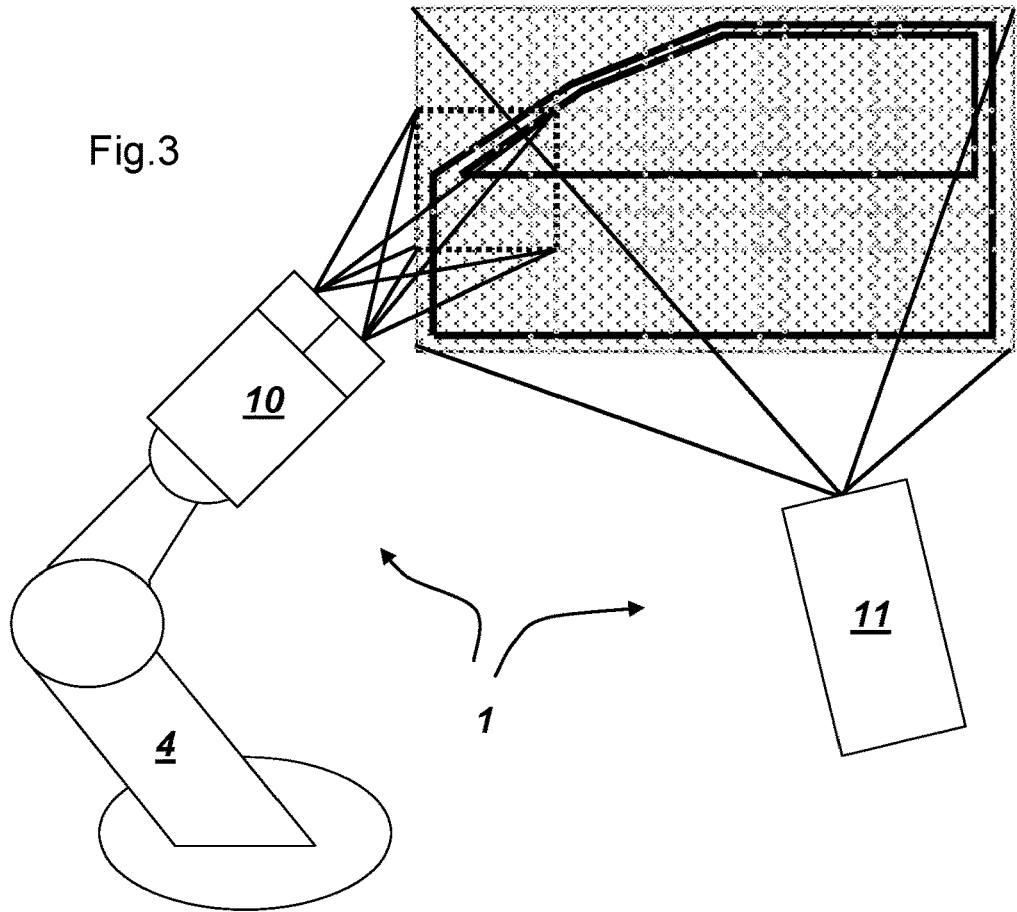
FIG. 3: shows a third embodiment of the measuring system according to the invention.

According to FIG. 3, the measuring device may be arranged at the end of a robot arm 4. Said robot arm 4 may comprise motorised joints and a control computer for bringing the measuring device 10 in particular poses. The robot arm 4 may be stationary or configured for being manually or automatically moved (e.g. in an assembly line).

Although the invention is illustrated above, partly with reference to some preferred embodiments, it must be understood that numerous modifications and combinations of different features of the embodiments can be made. All of these modifications lie within the scope of the appended claims.

What is claimed is:

1. A measuring system configured for three-dimensionally reconstructing a surface geometry of an object, the system comprising:
    a movable measuring device comprising a sensor and a first camera, wherein the sensor comprises an Electronic Distance Meter (EDM), wherein the measuring device is configured for:
        from a first pose:
            with the sensor, generating a first three-dimensional representation of a first portion of the object, and
            with the first camera, generating a first image covering at least part of the first portion of the object, and
        from a second pose:
            with the sensor, generating a second three-dimensional representation of a second portion of the object, and
            with the first camera, generating a second image covering at least part of the second portion of the object,
    a stationary first projector arranged externally with respect to the measuring device, and configured for projecting a texture onto both first and second portions of the object, and
    a stitching computer configured for generating a unitary three-dimensional representation of both the first and second portions of the object from the first and second three-dimensional representations based on the first and second images, wherein the stitching computer is configured for:
        applying an Expectation-maximisation (EM)-optimisation of the unitary three-dimensional representation of the first, second, and third portions of the object based on the first, second, and third images.

2. The measuring system according to claim 1, wherein the sensor comprises at least one camera.

3. A measuring system configured for three-dimensionally reconstructing a surface geometry of an object, the system comprising:

a movable measuring device comprising a sensor and a first camera, wherein the sensor comprises an Electronic Distance Meter (EDM), wherein the measuring device is configured for:
from a first pose:
with the sensor, generating a first three-dimensional representation of a first portion of the object, and
with the first camera, generating a first image covering at least part of the first portion of the object, and
from a second pose:
with the sensor, generating a second three-dimensional representation of a second portion of the object, and
with the first camera, generating a second image covering at least part of the second portion of the object,
a stationary first projector arranged externally with respect to the measuring device, and configured for projecting a texture onto both first and second portions of the object,
a second projector, which is stationary or comprised by the measuring device; and
a stitching computer configured for generating a unitary three-dimensional representation of both the first and second portions of the object from the first and second three-dimensional representations based on the first and second images.

4. The measuring system according to claim 1, wherein the texture has a non-repetitive pattern.

5. The measuring system according to claim 1, wherein the first projector is configured for projecting the same texture when the first camera is generating the first and second image.

6. The measuring system according to claim 1, wherein, for generating a unitary three-dimensional representation, the stitching computer is configured for matching the first and second three-dimensional representations based on the texture as captured in the first and second images.

7. The measuring system according claim 1, wherein the first image, the second image, the first three-dimensional representation, and the second three-dimensional representations have a common overlap area.

8. The measuring system according to claim 1, wherein, for generating a unitary three-dimensional representation, the stitching computer is configured for transforming at least one of the first and second three-dimensional representations based on matching the texture as captured in the first image and the texture as captured in the second image.

9. The measuring system according to claim 1, wherein the measuring device is further configured for,
from a third pose:
with the sensor, generating a third three-dimensional representation of a third portion of the object, and
with the first camera, generating a third image covering at least part of the third portion of the object, and
wherein the stitching computer is configured for:
generating a unitary three-dimensional representation of the first, second, and third portions of the object from the first, second, and third three-dimensional representations based on the third image and at least one of the first and second image.

10. A measuring system configured for three-dimensionally reconstructing a surface geometry of an object, the system comprising:
a movable measuring device comprising a sensor and a first camera, wherein the measuring device is configured for:
from a first pose:
with the sensor, generating a first three-dimensional representation of a first portion of the object, and
with the first camera, generating a first image covering at least part of the first portion of the object, and
from a second pose:
with the sensor, generating a second three-dimensional representation of a second portion of the object, and
with the first camera, generating a second image covering at least part of the second portion of the object,
a stationary first projector arranged externally with respect to the measuring device, and configured for projecting a texture onto both first and second portions of the object,
a second projector, which is stationary or comprised by the measuring device, and
a stitching computer configured for generating a unitary three-dimensional representation of both the first and second portions of the object from the first and second three-dimensional representations based on the first and second images, wherein the stitching computer is configured for:
applying an Expectation-maximisation (EM)-optimisation of the unitary three-dimensional representation of the first, second, and third portions of the object based on the first, second, and third images.

11. The measuring system according to claim 1, wherein the stitching computer is configured for:
receiving pose data, wherein the pose data represent a chronological sequence of poses of the measuring device, and
generating the unitary three-dimensional representation based on the pose data.

12. The measuring system according to claim 1, wherein the measuring device is configured for generating the pose data.

13. The measuring system according to claim 1, the system comprising:
positioning means configured for moving the measuring device, and
a controller configured for controlling the positioning means and providing the first and second pose as a predetermined pose.

14. The measuring system according claim 1, wherein the stitching computer is configured for scaling the three-dimensional representations by detecting and identifying a known marker in at least one of the first image and the second image.

15. The measuring system according to claim 3, wherein, for generating a unitary three-dimensional representation, the stitching computer is configured for matching the first and second three-dimensional representations based on the texture as captured in the first and second images.

16. The measuring system according to claim 3, wherein, for generating a unitary three-dimensional representation, the stitching computer is configured for transforming at least one of the first and second three-dimensional representations based on matching the texture as captured in the first image and the texture as captured in the second image.

17. The measuring system according to claim 3, wherein the measuring device is further configured for, from a third pose:
   with the sensor, generating a third three-dimensional representation of a third portion of the object, and
   with the first camera, generating a third image covering at least part of the third portion of the object, and
wherein the stitching computer is configured for:
   generating a unitary three-dimensional representation of the first, second, and third portions of the object from the first, second, and third three-dimensional representations based on the third image and at least one of the first and second image.

18. The measuring system according to claim 10, wherein, for generating a unitary three-dimensional representation, the stitching computer is configured for matching the first and second three-dimensional representations based on the texture as captured in the first and second images.

19. The measuring system according to claim 10, wherein, for generating a unitary three-dimensional representation, the stitching computer is configured for transforming at least one of the first and second three-dimensional representations based on matching the texture as captured in the first image and the texture as captured in the second image.

20. The measuring system according to claim 10, wherein the measuring device is further configured for,
from a third pose:
   with the sensor, generating a third three-dimensional representation of a third portion of the object, and
   with the first camera, generating a third image covering at least part of the third portion of the object, and
wherein the stitching computer is configured for:
   generating a unitary three-dimensional representation of the first, second, and third portions of the object from the first, second, and third three-dimensional representations based on the third image and at least one of the first and second image.

* * * * *